United States Patent [19]

Giles et al.

[11] 4,236,202

[45] Nov. 25, 1980

[54] INTEGRAL TRACKING OVERRIDE CONTROL

[75] Inventors: Richard F. Giles, Elk View, W. Va.; Larry D. Gaines, Bartlesville, Okla.

[73] Assignee: Phillips Petroleum Company, Bartlesville, Okla.

[21] Appl. No.: 973,981

[22] Filed: Dec. 28, 1978

[51] Int. Cl.³ .................... G06G 7/66; G05B 7/02; G05B 11/42
[52] U.S. Cl. .................... 364/105; 318/561; 318/609; 318/610; 364/108; 364/118
[58] Field of Search ............ 364/105, 118, 108, 110, 364/119, 117, 114, 115; 318/609, 610, 561, 563–566, 639, 590, 591; 364/500, 501, 502

[56] References Cited

U.S. PATENT DOCUMENTS

| | | | |
|---|---|---|---|
| 3,092,732 | 6/1963 | Milford et al. | 340/147 |
| 3,123,774 | 3/1964 | Davis et al. | 328/1 |
| 3,173,127 | 3/1965 | Brunner | 340/147 |
| 3,566,091 | 2/1971 | Bay et al. | 364/110 |
| 3,678,513 | 7/1972 | Ward, Jr. | 340/521 |
| 3,694,633 | 9/1972 | Levon | 318/591 X |
| 3,752,968 | 8/1973 | Pilafidis | 340/521 X |
| 3,815,114 | 6/1974 | Johnson et al. | 340/521 |
| 3,882,368 | 5/1975 | Carleton | 318/591 X |
| 3,938,017 | 2/1976 | Hayes | 318/610 |
| 3,940,593 | 2/1976 | Bleak et al. | 364/115 |
| 3,988,730 | 10/1976 | Valker | 340/521 |
| 4,059,745 | 11/1977 | Gaertner | 364/108 |
| 4,139,887 | 2/1979 | Levesque, Jr. | 364/105 |

OTHER PUBLICATIONS

Giles et al.—"Integral-Tracking Override Is Better Than Output-Tracking", Control Engineering, pp. 63–65, Feb. 1978.

*Primary Examiner*—Joseph F. Ruggiero

[57] ABSTRACT

An override control system is provided in which the integral mode of the controllers not selected is forced to track the integral mode of the selected controller to prevent windup of the controllers not selected. Selection of the active controller is based only on the proportional mode for proportional-integral controllers. Selection of the active controller is based only on the proportional mode and the derivative mode for proportional-integral-derivative controllers.

31 Claims, 11 Drawing Figures

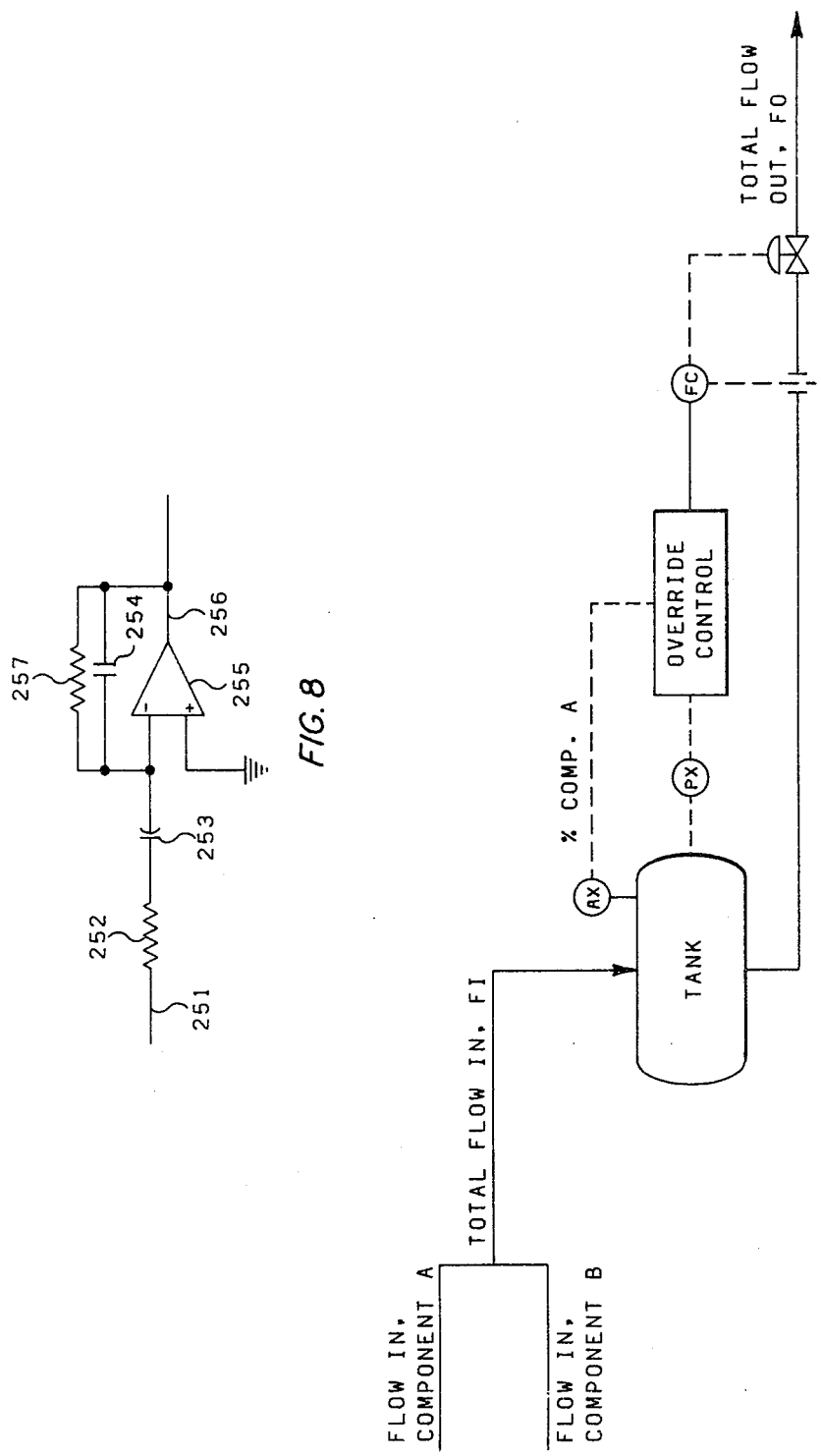

INTEGRAL TRACKING OVERRIDE CONTROL

This invention relates to method and apparatus for controlling a process. In a particular aspect this invention relates to method and apparatus for preventing windup of a controller in an automatic override control system. In another particular aspect this invention relates to method and apparatus for forcing the integral mode of the controllers not selected in an automatic override control system to track the integral mode of the selected controller. In still particular aspect this invention relates to an automatic override control system in which only the proportional mode of the proportional-integral controllers is utilized to select the active controller. In still another particular aspect, this invention relates to an automatic override control system in which only the proportional mode and the derivative mode of the proportional-integral-derivative controllers is utilized to select the active controller.

Logical selection of one control loop over another control loop for best control within allowable constraints is generally called "override control". Override control is applicable to many processes which involve two or more dependent variables which may be controlled by manipulating a single control variable. An example of such a process is a reactor where the objective is to operate at, or below, a temperature set point value. Several independent temperature measurements are taken in the reaction vessel and the reaction temperature controlled by a feed heater. In such a case, the highest temperature sensed could logically be selected for control. In a more complex example, it might be required to control both pressure and composition in a process by manipulating a bleed valve. For one set of operating conditions it might be feasible to maintain the pressure at its set point value while allowing the composition to drift below its set point. For other conditions the reverse could be true.

In some situations, override control can be performed by a process operator, provided that the dynamics of the process are slow enough and the switching time spaced widely enough that his ability to respond is not exceeded. However, for fast control loops which are critical to the process performance, automatic override control is normally used. Automatic override control is commonly implemented by using a high or low select element to compare and select the outputs of individual loop controllers on a short term basis. In the past, it has been common to force the output of the controller not selected to track the output of the selected controller by adjusting either its integral mode gain or its feedback signal. This output tracking prevents windup of the unselected controller and provides for bumpless transfer between the controllers. For example, if the output of a first controller begins to exceed the output of a second controller, then conventional tracking logic would force the output of the second controller to track that of the first controller and control action would be based on the output signal of the first controller. This would continue until such time as the output of the second controller begins to exceed that of the first controller and the tracking and control functions would then reverse.

This conventional type of override control in which the output of the controller not selected is forced to track the output of the selected controller can lead to control problems. A situation may occur in which the process variable being supplied to the second controller is well below its set point value because it has drifted down while the process variable being supplied to the first controller has been on control. If a process disturbance occurs that effects the value of the second process variable but not the value of the first process variable, it is possible for the conventional control logic to transfer control to the second controller because its output will exceed that of the first controller for a short time. This transfer may occur even though the disturbance may not be of sufficient magnitude to drive the value of the second process variable to equal its set point level. Thus, the combination of output tracking and override selection based on controller output can transfer control to the wrong controller. A similar situation may occur if the disturbance decreased the value of the first process variable without affecting the value of the second process variable.

It is thus an object of this invention to provide method and apparatus for controlling a process by using an override control system in which windup of the controllers not selected is prevented by forcing the integral mode of the controller not selected to track the integral mode of the selected controller. It is another object of this invention to provide an automatic override control system in which only the proportional mode of the proportional-integral controllers is utilized to select the active controller to prevent the wrong controller from being selected. Still another object of this invention is to provide an automatic override control system in which only the proportional mode and the derivative mode of the proportional-integral-derivative controllers is utilized to select the active controller to both prevent the wrong controller from being selected and to provide directly for override based on the rate of change of the process variables.

In accordance with the present invention, method and apparatus is provided whereby the integral modes of the controllers utilized in the automatic override control system are forced to track each other. Thus, if the controllers being utilized are proportional-integral controllers, the integral mode of each proportional-integral controller will be equal to the integral mode of the other proportional-integral controllers and will specifically be equal to the integral mode of the controller which has been selected. Thus, the controller whose proportional mode requires the more positive (for a high select criterion) or negative (for a low select criterion) control position would be selected by the override logic as the active controller. This scheme prevents the integral mode of the controllers not selected from winding up and also preserves the bumpless transfer feature of the output tracking control since control will be transferred only when the output of the active controller is essentially equal to a controller which has not been selected.

The present invention also provides method and apparatus for basing the override on the rate of change of the process variables by using proportional-integral-derivative controllers with their integral modes tracking. The selection logic will then base its controller selection on the proportional mode and the derivative mode values for the controllers since the integral mode values for the controllers will be equal.

Other objects and advantages of the invention will be apparent from the description of the invention and the appended claims as well as from the detailed description of the drawings in which:

FIG. 8 is a schematic of the differentiator illustrated in FIG. 7;

FIG. 9 is a diagrammatic representation of a process and an associated control system for the process;

For the sake of simplicity, the invention is illustrated and described in terms of only two controllers. The invention, however, is applicable to multiple controllers in which the integral mode of all of the controllers which have not been selected would be forced to track the integral mode of the controller which is selected.

The invention is also described in terms of analog logic and an analog circuit. However, the invention could also be implemented on a digital computer if desired.

The invention is described in terms of proportional-integral controllers and proportional-integral-derivative controllers. The operation of these types of controllers is well known in the art. The output control signal of a proportional-integral controller may be represented as $$S = K_1 E + K_2 \int E \, dt$$

where
S = output control signal;
E = difference between two input signals; and
$K_1$ and $K_2$ = constants.

The output control signal of a proportional-integral-derivative controller may be represented as $$S = K_1 E + K_2 \int E \, dt + K_3 \, dE/dt$$

where
S = output control signal;
E = difference between two input signals; and
$K_1$, $K_2$ and $K_3$ = constants.

The invention is illustrated in terms of a high select logic for the automatic override control. However, the invention is also applicable to low select logic and limit select logic if such logic is desired.

Figure 1:
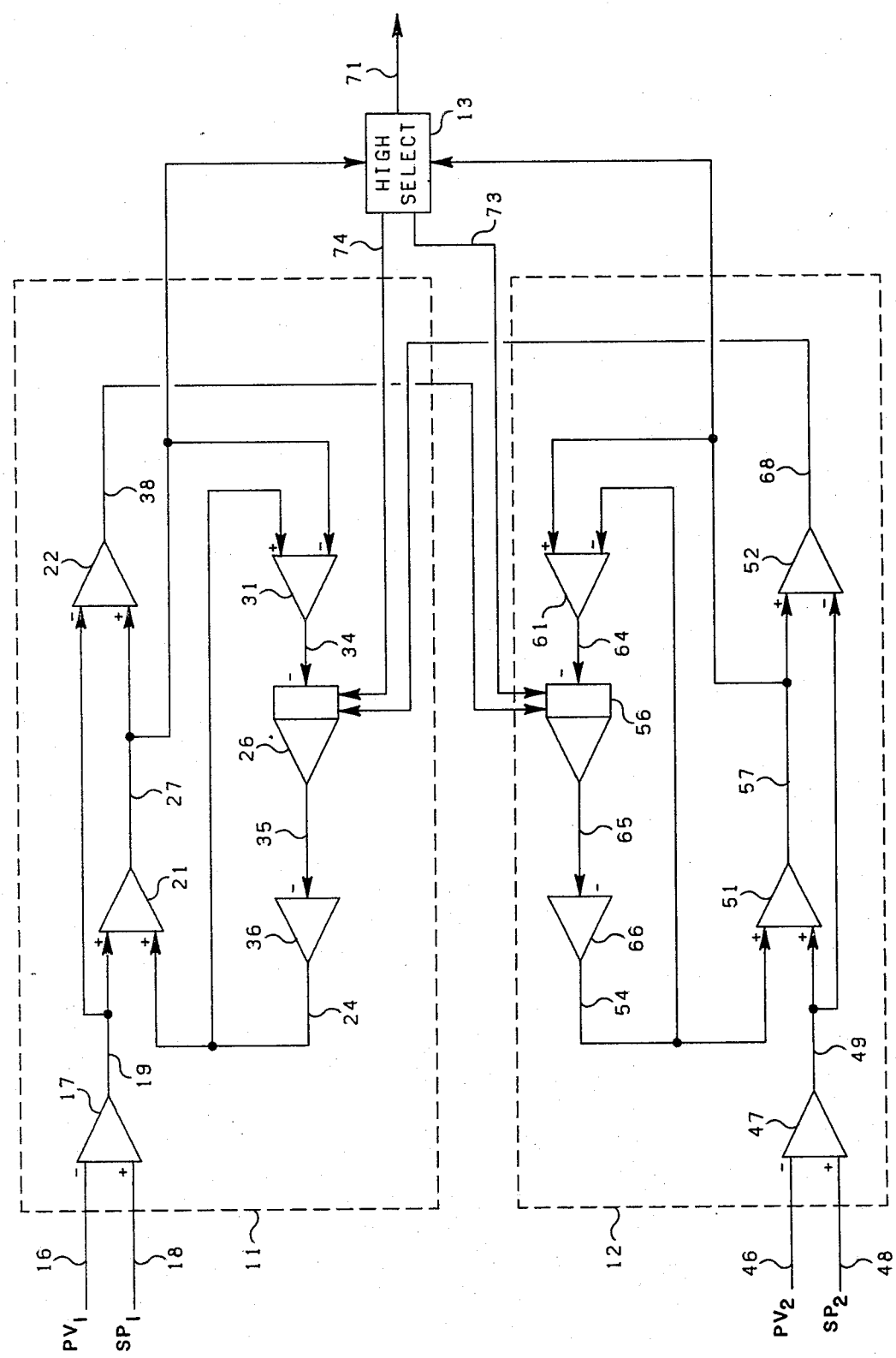
FIG. 1 is a diagrammatic representation of two proportional-integral controllers with integral mode tracking between the two proportional-integral controllers.

Referring now to the drawings, and in particular to FIG. 1, two proportional-integral controllers 11 and 12 are illustrated together with a high select circuit 13. A first process variable signal 16 ($PV_1$) is provided as a first input to the differential amplifier 17. The set point value 18 ($SP_1$) for the first process variable 16 is supplied as a second input to the differential amplifier 17. The output signal 19 from the differential amplifier 17 is thus representative of the difference between the first process variable 16 and the set point value 18 for the first process variable 16 with the difference being multiplied by the gain of the differential amplifier 17. Signal 19 may thus be represented as $K_{P1}E_1$ where $K_{P1}$ is the proportionality constant or the gain of the differential amplifier 17 and $E_1$ is the difference between the process variable signal 16 and the set point signal 18. Signal 19 is provided from the differential amplifier 17 as a first input to the summing amplifier 21 and is also supplied as a first input to the differential amplifier 22.

Signal 24, which is supplied as a second input to the summing amplifier 21 and as a first input to the differential amplifier 31, is representative of $K_{P1}K_{I1} \int E_1 dt$ where $K_{I1}$ is the gain associated with the integrator 26 and $K_{P1}$ and $E_1$ are as previously defined. The term $K_{P1}K_{I1}$ is often referred to as simply the integral gain. The constant $K_{P1}$ may not be included in the integral gain in some controllers but is included in the integral gain term in the preferred embodiment of the present invention. The term $K_I$ is often used to refer to whatever constants are associated with the integral term of the controller output. The manner in which signal 24 is generated will be described hereinafter. Signal 24 is summed with signal 19 in the summing amplifier 21 to provide signal 27 which is representative of $K_{P1}E_1 + K_{P1}K_{I1} \int E_1 dt$. Signal 27 is provided as a second input to the differential amplifier 22, as a second input to the differential amplifier 31 and as a first input to the high select circuit 13.

Signal 24 is essentially subtracted from signal 27 by the differential amplifier 31 to provide signal 34 which is representative of $K_{P1}E_1$. Signal 34 is provided from the output of the differential amplifier 31 as an input to the integrator 26. Signal 34 is integrated by the integrator 26 to provide signal 35 which is representative of $-K_{P1}K_{I1} \int E_1 dt$. Signal 35 is provided from the integrator 26 to the inverter 36. Signal 35 is inverted by the inverting amplifier 36 to provide signal 24 which is utilized as previously described.

Signal 19 is essentially subtracted from signal 27 by the differential amplifier 22 to provide the output signal 38 which is representative of $K_{P1}K_{I1} \int E_1 dt$. Signal 38 is provided from the output of the differential amplifier 22 to the initial condition input of the integrator 56.

A second process variable signal 46 ($PV_2$) is provided as a first input to the differential amplifier 47. The set point value 48 ($SP_2$) for the second process variable 46 is supplied as a second input to the differential amplifier 47. The output signal 49 from the differential amplifier 47 is thus representative of the difference between the second process variable 46 and the set point value 48 for the second process variable 46 with the difference being multiplied by the gain of the differential amplifier 47. Signal 49 may thus be represented as $K_{P2}E_2$ where $K_{P2}$ is the proportionality constant or the gain of the differential amplifier 47 and $E_2$ is the difference between the process variable signal 46 and the set point signal 48. Signal 49 is provided from the differential amplifier 47 as a first input to the summing amplifier 51 and is also supplied as a first input to the differential amplifier 52.

Signal 54, which is supplied as a second input to the summing amplifier 51 and as a first input to the differential amplifier 52, is representative of $K_{P2}K_{I2} \int E_2 dt$ where $K_{I2}$ is the gain associated with the integrator 56 and $K_{P2}$ and $E_2$ are as previously defined. The manner in which signal 54 is generated will be described hereinafter. Signal 54 is summed with signal 49 in the summing amplifier 51 to provide signal 57 which is representative of $K_{P2}E_2 + K_{P2}K_{I2}\int E_2 dt$. Signal 57 is provided as a second input to the differential amplifier 52, as a first input to the differential amplifier 51 and as a second input to the high select circuit 13.

Signal 54 is essentially subtracted from signal 57 by the differential amplifier 61 to provide signal 64 which is representative of $K_{P2}E_2$. Signal 64 is provided from the output of the differential amplifier 61 as an input to the integrator 56. Signal 64 is integrated by the integrator 56 to provide signal 65 which is representative of $-K_{P2}K_{I2}\int E_2 dt$. Signal 65 is provided from the integrator 56 to the inverter 66. Signal 65 is inverted by the inverting amplifier 66 to provide signal 54 which is utilized as previously described.

Signal 49 is essentially subtracted from signal 57 by the differential amplifier 52 to provide the output signal 68 which is representative of $K_{P2}K_{I2}\int E_2 dt$. Signal 68 is provided from the output of the differential amplifier 52 to the initial condition input of the integrator 26.

The higher of signals 27 and 57 will be selected by the high select circuit 13 and will be supplied as the process control signal 71. If the output signal 27 from controller 11 is selected, then signal 71 will be equal to signal 27. In like manner, if the output signal 57 from controller 12 is selected, then the process control signal 71 will be equal to signal 57.

The logic control signals 73 and 74 are utilized to force the integral mode of the controllers 11 and 12 to track the integral mode of the controller which is selected to supply the process control signal 71. Essentially, if the output signal 27 from controller 11 is selected, then the logic control signal 73 will disable the integrator 56 from integrating signal 64 and will instead force signal 65 to be equal to signal 38 by closing a switch which supplies signal 38 to the initial condition input of the integrator 56. When this occurs, the output signal 57 from the controller 12 will be equal to $K_{P2}E_2 + K_{P1}K_{I1}\int E_1 dt$. It can thus be seen that the only difference between signal 27 and signal 57 will be the proportional terms because the integral terms are equal. Thus, the high select 13 will select the controller output based only on the proportional mode. This effectively prevents the wrong controller from being selected while also insuring that the integral mode of the controller which is not selected will not wind up.

If the output signal 57 from the controller 12 is selected as the process control signal 71, then the logic signal 74 will close a switch which enables the signal 68 to be provided to the initial condition input of the integrator 26 and disables the integration of signal 34 by the integrator 26. Thus, the output signal 35 from the integrator 26 will be equal to signal 68 except for the inversion caused by the integrator 26. The output signal 27 from the controller 11 will thus be equal to $K_{P1}E_1 + K_{P2}K_{I2}\int E_2 dt$. The only difference between signals 57 and 27 will again be the proportional mode term and the high select circuit 13 will again select the control signal based only on the proportional mode of the output signal 27 and 57 from controllers 11 and 12 respectively.

Figure 2:
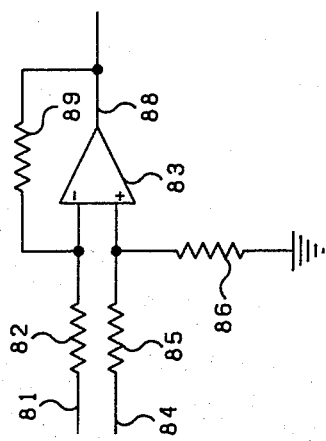
FIG. 2 is a schematic of the differential amplifiers illustrated in FIG. 1.

A circuit which can be utilized for differential amplifiers 17, 22, 31, 47, 52 and 61, illustrated in FIG. 1, is illustrated in FIG. 2. A first input 81 is provided through resistor 82 to the inverting input of the operational amplifier 83. A second input 84 is provided through the parallel combination of resistors 85 and 86 to the noninverting input of the operational amplifier 83. The output 88 of the operational amplifier 83 is fed back to the inverting input of the operational amplifier 83 through resistor 89. The output signal 88 from the operational amplifier 83 will be essentially equal to the difference between signals 81 and 84. The gain of the operational amplifier 83 is determined by the scaling of resistors 82 and 89. The value of the feedback resistor 89 divided by the value of the input resistor 82 essentially gives the gain of the differential amplifier circuit. Thus if resistor 89 is ten times larger than resistor 82 the differential amplifier circuit will essentially have a gain of 10. Additionally, resistor 82 must be matched to resistor 85 and resistor 89 must be matched to resistor 86.

Commercially available components which can be utilized and the circuit illustrated in FIG. 2 are as follows:

| | |
|---|---|
| Operational amplifier 83 | MC 1741S, Motorola |
| Resistors 82,85,86 and 89   20K ohms .1% | Model 300211 Vishay, 63 Lincoln Highway Malvern, PA, 19355 |

Figure 3:
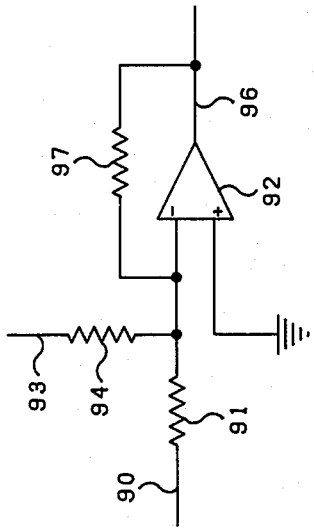
FIG. 3 is a schematic of the summing amplifiers illustrated in FIG. 1.

A circuit which can be utilized for the summing amplifiers 21 and 51, illustrated in FIG. 1, is illustrated in FIG. 3. A first input signal 90 is supplied through resistor 91 to the inverting input of the operational amplifier 92. A second input signal 93 is supplied through resistor 94 to the inverting input of operational amplifier 92. The noninverting input of operational amplifier 92 is tied to ground. The output signal 96 from the operational amplifier 92 is fed back through resistor 97 to the inverting input of operational amplifier 92. The output signal 96 will be essentially equal to the sum of signals 90 and 93 multiplied by the gain of the summing amplifier. The gain of the summing amplifier illustrated in FIG. 3 is essentially the value of the feedback resistor 97 divided by the value of resistor 91 or 94 for equal weighting of signals 90 and 93.

Commercially available components which can be utilized in the circuit illustrated in FIG. 3 are as follows:

| | | |
|---|---|---|
| Operational amplifier 92 | | MC1741S, Motorola |
| Resistors 91,94 and 97 | 10K ohms | RN55D, Dale Electronics |

Figure 4:
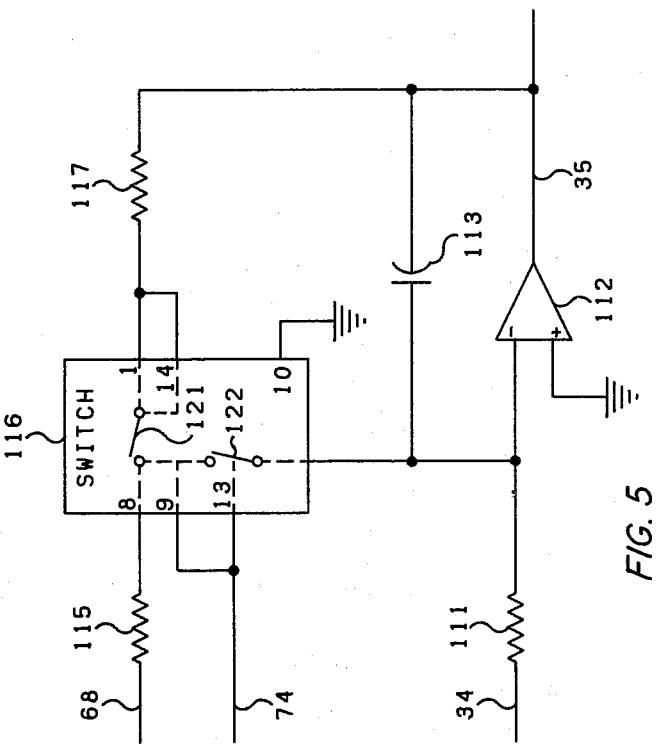
FIG. 4 is a schematic of the inverting amplifiers illustrated in FIG. 1.

A circuit which can be utilized for inverters 36 and 66 is illustrated in FIG. 4. An input signal 101 is supplied through resistor 102 to the inverting input of the operational amplifier 103. The noninverting input of the operational amplifier 103 is tied to ground through resistor 105. The output signal 106 from the operational amplifier 103 is fed back through resistor 107 to the inverting input of the operational amplifier 103. The output signal 106 will be equal to the inverse of signal 101 multiplied by the gain of the inverting amplifier. The gain of the inverting amplifier may be determined by dividing the value of the feedback resistor 107 by the value of the input resistor 102. In this preferred embodiment, a unity gain inverter is preferred and thus the value of the feedback resistor 107 is equal to the value of the input resistor 102.

Commercially available components which can be utilized in the circuit illustrated in FIG. 4 are as follows:

| | | |
|---|---|---|
| Operational amplifier 103 | | MC1741S, Motorola |
| Resistors 102 and 107 | 10K ohms | RN55D, Dale Electronics |
| Resistor 105 | 5K ohms | RN55D, Dale Electronics |

Figure 5:
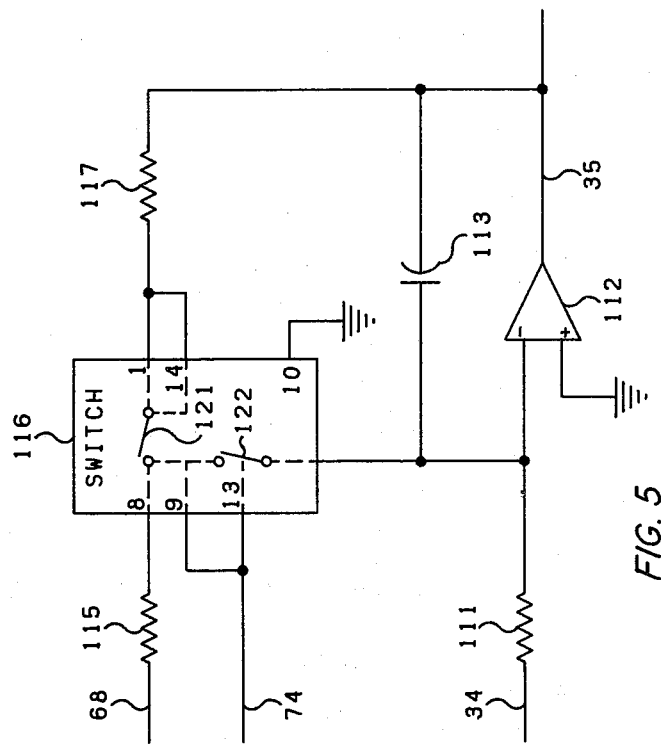
FIG. 5 is a schematic of the integrators illustrated in FIG. 1.

A circuit which can be utilized as integrator 26 or 56 is illustrated in FIG. 5. Signals applicable to integrator 26 are utilized in FIG. 5 to illustrate the operating principles of the circuit illustrated in FIG. 5. The description is, however, also applicable to integrator 56 and the signals associated with integrator 56. Referring now to FIG. 5, signal 34 which is representative of $K_{P1}E_1$ is supplied through resistor 111 to the inverting input of the operational amplifier 112. The noninverting input of operational amplifier 112 is tied to ground. The output signal 35 from the operational amplifier 112 is fed back to the inverting input of operational amplifier 112 through capacitor 113. The circuit made up of resistor 111, capacitor 113 and operational amplifier 112 is a common form of an integrating circuit. Signal 68, which is representative of $K_{P2}K_{I2}\int E_2 dt$, is supplied through resistor 115 to pin 8 of the switch 116 which is preferably a AH0151/DG151 manufactured by Analog Devices. Signal 74, from the high select circuit 13, is supplied to pins 9 and 13 of the switch 116. Pin 1 of the switch 116 is tied to the inverting input of operational amplifier 112. Pins 7 and 14 of the switch 116 are tied through resistor 117 to the output of the operational amplifier 112. Pin 10 of the switch 116 is tied to ground.

When controller 11 has been selected by the high select 13, signal 74 from the high select 13 will be low (approximately 0 volts). When signal 74 is low, switches 121 and 122 will be open. Signal 34 will be integrated by the integrating circuit made up of resistor 111, capacitor 113, operational amplifier 112 and signal 35 will thus be representative of $K_{P1}K_{I1}\int E_1 dt$.

If controller 12 has been selected by the high select to supply the process control signal 71, then signal 74 from the high select circuit 13 will go high (approximately 5 volts). When signal 74 goes high, switches 121 and 122 will be closed. Resistor 111 is preferably a 15 megohm resistor. Resistor 115 is preferably a 20 K ohm resistor. Because resistor 111 is much larger than resistor 115, when switches 122 and 121 close the RC time constant associated with resistor 115 and capacitor 113 will be much smaller than the RC time constant associated with resistor 111 and capacitor 113. Therefore, signal 34 will not be integrated by the integrating circuit 112 but rather signal 35 will take on a value approximately equal to signal 68. Signal 35 will thus be representative of $K_{P2}K_{I2}\int E_2 dt$. In this manner, integral tracking is provided for the controller not selected to supply the process variable signal 71.

Commercially available components which can be utilized in the circuit illustrated in FIG. 5 are as follows:

| | | |
|---|---|---|
| Switch 116 | AH0151/DG 151 | Analog Devices |
| Operational amplifier 112 | | LM308A, Signetics |
| Capacitor 113 | 10 mfd, | Type X463UW, TRW |
| Resistors 115 and 117 | 20K ohms, | RN55D, TRW |

-continued

| | | |
|---|---|---|
| Resistor 111 | 50 meg, | RN80T0, TRW |

Figure 6:
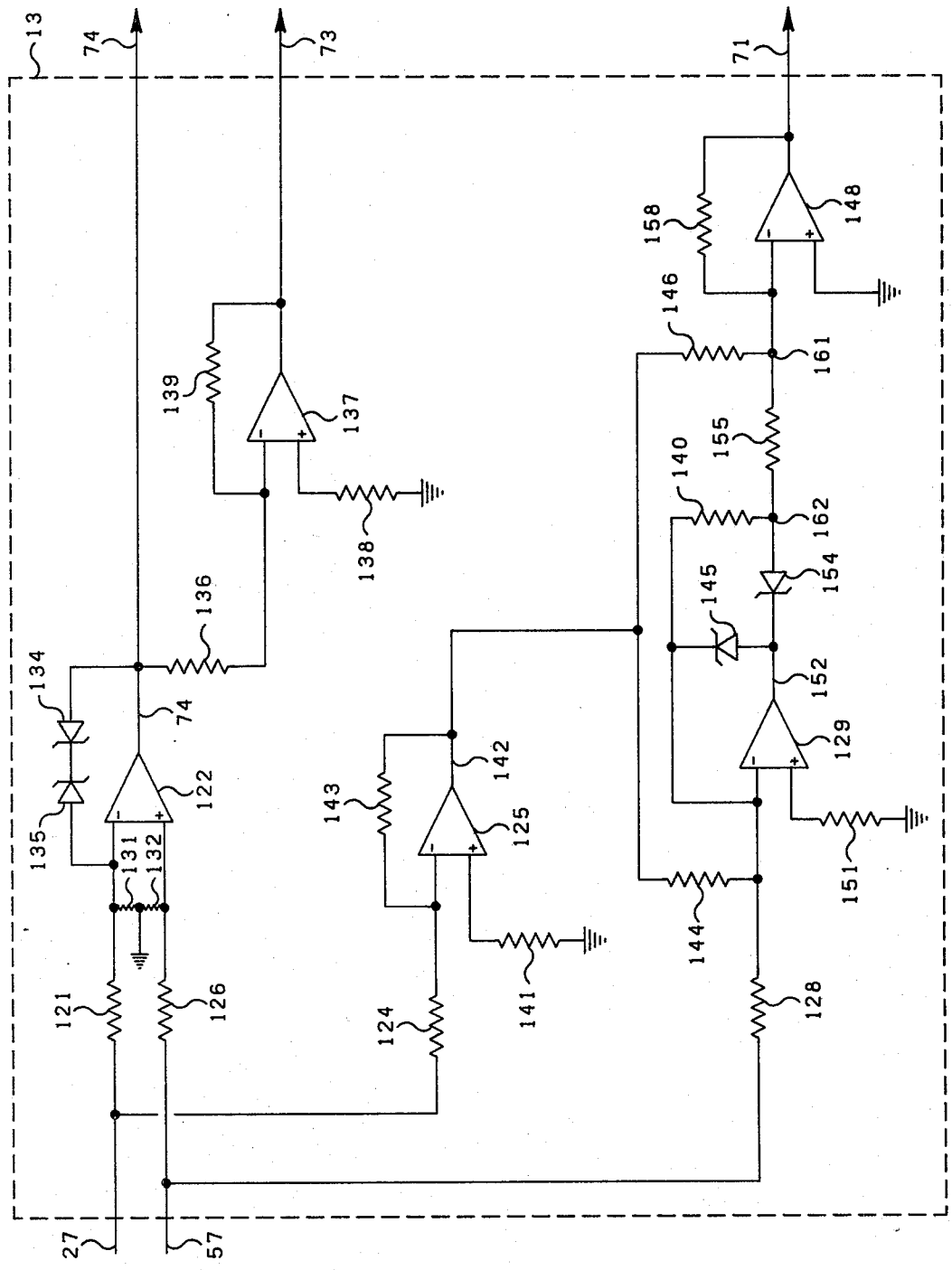
FIG. 6 is a schematic of the high select illustrated in FIG. 1.

A circuit which can be utilized for the high select circuit 13, illustrated in FIG. 1, is illustrated in FIG. 6. Signal 27, which is representative of the output of controller 11, is provided through resistor 121 to the inverting input of operational amplifier 122 and is also supplied through resistor 124 to the inverting amplifier of operational amplifier 125. Signal 57, which is representative of the output of controller 12, is supplied through resistor 126 to the noninverting input of operational amplifier 122 and is also supplied through resistor 128 to the inverting input of operational amplifier 129. The inverting input of operational amplifier 122 is tied to ground through resistor 131. The noninverting input of operational amplifier 122 is tied to ground through resistor 132. The output signal 74 from the operational amplifier 122 is fed back to the inverting input of operational amplifier 122 through the Zener diodes 134 and 135. The output signal 74 from the operational amplifier 122 is also supplied as one of the logic signals from the high-select circuit 13 and is also supplied through resistor 136 to the inverting input of operational amplifier 137. The noninverting input of operational amplifier 137 is tied to ground through resistor 138. The output signal 73 is fed back to the inverting input of operational amplifier 137 through resistor 139. Signal 73 is provided as the second logic output from the high-select circuit 13. Zener diodes 135 and 134 are utilized to clamp the output voltage from operational amplifier 122 in such a manner that the output voltage from operational amplifier 122 cannot be greater than approximately +5 volts and cannot be less than approximately −5 volts. When signal 27 is more positive than signal 57, the output of the operational amplifier 74 will go negative to approximately −5 volts. Signal 74 will be inverted by the unity gain inverter made up of operational amplifier 137 and its associated resistors. Thus signal 73 will have a voltage level of +5 volts and signal 74 will have a voltage level of −5 volts. This will cause the integral mode of controller 12 to track the integral mode of controller 11 in the manner described in FIG. 5.

In the same manner, if signal 57 is more positive than signal 27 then signal 74 will have a voltage level of approximately +5 volts and signal 73 will have a voltage level of approximately −5 volts. This will cause the integral mode of controller 11 to track the integral mode of controller 12 in the manner described in FIG. 5.

The noninverting input of operational amplifier 125 is tied to ground through resistor 141. The output signal 142 from operational amplifier 125 is fed back to the inverting input of operational amplifier 125 through resistor 143 and is also tied through resistor 144 to the inverting input of operational amplifier 129 and through resistor 146 to the inverting input of operational amplifier 148. The noninverting input of operational amplifier 129 is tied to ground through resistor 151. The output signal 152 from the operational amplifier 129 is fed back to the inverting input of operational amplifier 129 through the combination of resistor 140, diode 154 and diode 145. The output 152 from the operational amplifier 129 is also tied through diode 154 and resistor 155 to the inverting input of operational amplifier 148. The noninverting input of operational amplifier 148 is tied to ground. The output 71 from the operational amplifier 148 is supplied as the process control signal and is also fed back to the inverting input of operational amplifier 148 through resistor 158.

The operation of the circuit made up of operational amplifiers 125, 129 and 148 and their associated resistors and diodes can be illustrated as follows. Consider the situation where signal 27 is equal to 1 volt and signal 57 is equal to 2 volts. Operational amplifier 125 and its associated resistive elements in a unity gain inverter. Thus, signal 142 will have a value of −1 volt. This −1 volt is summed with signal 57 and the resulting summation is inverted to give a value for signal 152 of approximately −1 volt. When the output of the operational amplifier 129 is negative, diode 145 will not conduct and diode 154 will conduct, resulting in a −1 volt being present at junction 162. This −1 volt is summed with the −1 volt output 142 of amplifier 125 to result in a +2 volt signal at the output 71 of amplifier 148. Thus, signal 71 is identical to signal 57, the greater of signals 57 and 27.

If signal 27 is equal to 2 volts and signal 57 is equal to 1 volt, then the voltage level of signal 142 will be equal to −2 volts and the output 152 from the operational amplifier 129 will have a value of +1 volt. Diode 145 will conduct but diode 154 will not conduct. For this reason the voltage level at the junction 162 will be 0 which results in −2 volts being applied to inverting amplifier 148. This −2 volt signal is again inverted by operational amplifier 148 to provide signal 71 which has a value of 2 volts and corresponds to signal 27 in this case.

Commercially available components which can be utilized in the circuit illustrated in FIG. 6 are as follows:

| | |
|---|---|
| Operational amplifiers 122,137,125, 129, and 148 | MC1747S, Motorola |
| Zener diodes 134 and 135 | 1N5522, National Semiconductor |
| Diodes 145 and 154 | 1N914, Fairchild Semiconductor |
| Resistors 121,126,131,132,136,139,124 143,128,144,140,155,146 and 158 | 10K ohms, RN55D, TRW |
| Resistor 138, 141 and 151 | 51K, RN55D, TRW |

Figure 7:
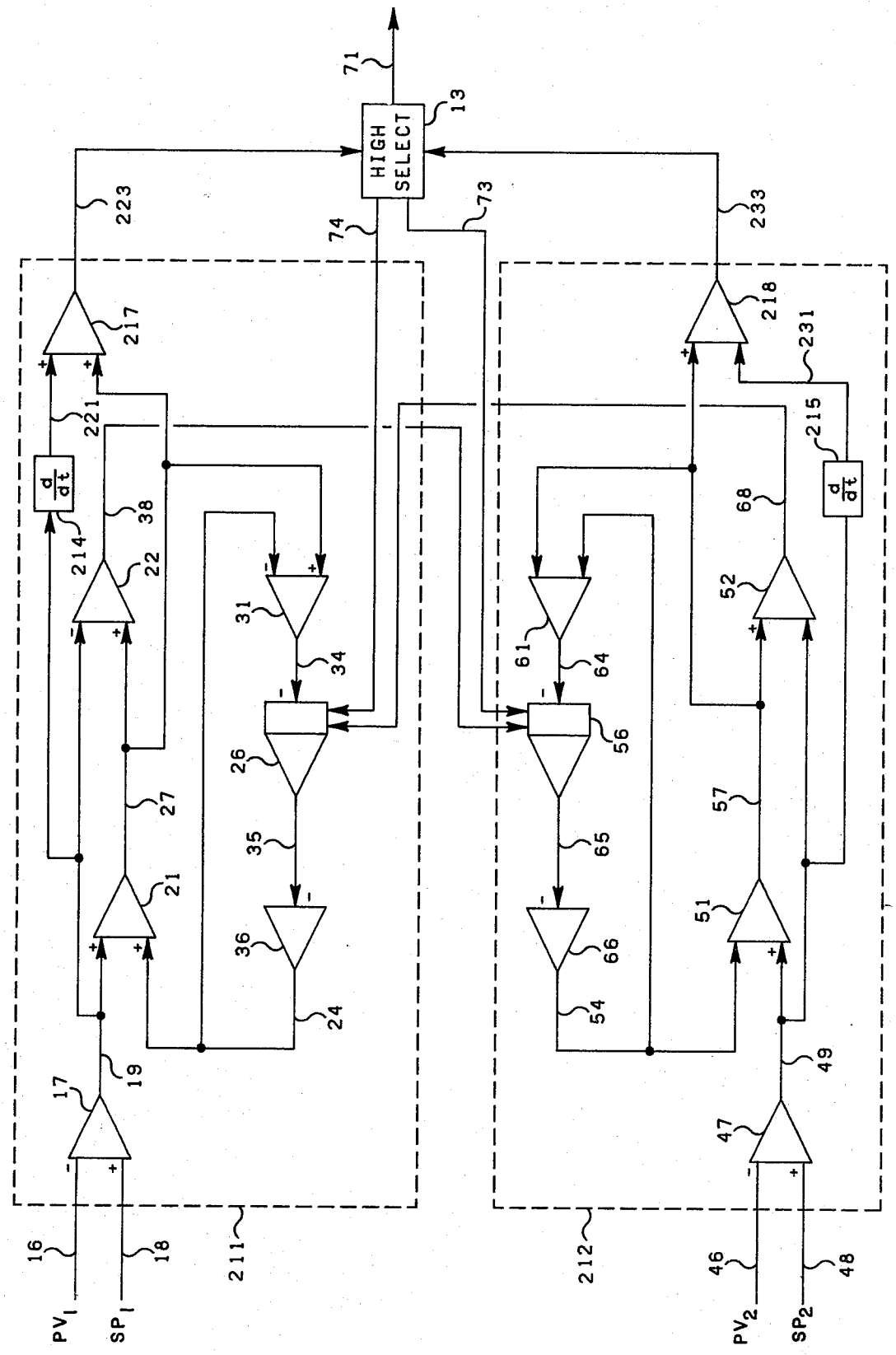
FIG. 7 is a diagrammatic representation of two proportional-integral-derivative controllers with integral mode tracking between the two proportional-integral-derivative controllers.

As has been previously stated, the automatic override control can be based on the rate of change of the process variables while still utilizing the integral tracking. The use of proportional-integral-derivative controllers to accomplish this function is illustrated in FIG. 7. Referring now to FIG. 7, two proportional-integral-derivative controllers 211 and 212 are illustrated. The only difference between the proportional-integral-derivative controllers 211 and 212 and the proportional-integral controllers 11 and 12 illustrated in FIG. 1 is the addition of the derivative blocks 214 and 215 and the addition of the summing amplifiers 217 and 218. The remainder of the circuit operates as has been previously described in conjunction with the description of FIGS. 1-6 and the circuit elements have been numbered to correspond with the reference numerals for FIG. 1.

Signal 19 which is representative of $K_{P1}E_1$ is supplied as an input to the derivative block 214. The output signal 221 from the derivative block 214 is representative of $K_{P1}K_{D1}dE_1/dt$ where $K_{D1}$ is the gain of the derivative block 214. Signal 221 is provided from the derivative block 214 as a first input to the summing amplifier 217. Signal 27, which is provided as an output of the summing amplifier 21, was previously supplied directly to the high select block 13 in FIG. 1. Signal 27 is representative of $K_{P1}E_1+K_{P1}K_{I1}\int E_1 dt$. Instead of being supplied directly to the high select block 13, signal 27 is now supplied as the second input to the summing amplifier 217 to be summed with signal 221 to thereby provide the output signal 223 from the proportional-integral-derivative controller 211. Signal 223 is representative of $K_{P1}E_1+K_{P1}K_{I1}\int E_1 dt+K_{P1}K_{D1}dE_2/dt$. Signal 223 is provided from the summing amplifier 217 as a first input to the high select block 13.

Signal 49 which is representative of $K_{P1}E_1$ is supplied as an input to the derivative block 215. The output signal 231 from the derivative block 215 is representative of $K_{P2}K_{D2}dE_1/dt$ where $K_{D2}$ is the gain of the derivative block 215. Signal 231 is provided from the derivative block 215 as a first input to the summing amplifier 218. Signal 57, which is provided as an output of the summing amplifier 51, was supplied directly to the high select block 13 in FIG. 1. Signal 57 is representative of $K_{P2}E_2+K_{P2}K_{I2}"E_2 dt$. Instead of being supplied directly to the high select block 13, signal 57 is supplied as the second input to the summing amplifier 218 to be summed with signal 231 to thereby provide the output signal 233 from the proportional-integral-derivative controller 212. Signal 233 is representative of $K_{P2}E_2+K_{P2}K_{I2}\int E_2 dt+K_{P2}K_{D2}dE_2/dt$. Signal 233 is provided from the summing amplifier 217 as a first input to the high select block 13.

The integral mode tracking operates as has been previously described in FIG. 1. Thus, if signal 223 is selected by the high select circuit 13 to be provided as the process control signal 71, then signal 233 will be representative of $K_{P2}E_2+K_{P1}K_{I1}\int E_1 dt+K_{E2}K_{I2}dE_2/dt$. It can thus be seen that the only difference between signal 223 and signal 233 will be the proportional mode terms and the derivative mode terms. Selection of signals 223 or signal 233 will thus be based only on the proportional term and the derivative term. This provides for automatic override control based on the rate of change of the process variables which is indicated by the derivative term.

A differentiator circuit which can be utilized for the differentiator blocks 214 and 215 illustrated in FIG. 7 is illustrated in FIG. 8. An input signal 251 is provided through resistor 252 and capacitor 253 to the inverting input of the operational amlifier 255. The noninverting input of the operational amplifier 255 is tied to ground. The output signal 256 from the operational amplifier 255 is fed back through resistor 257 in parallel with capacitor 254 to the inverting input of operational amplifier 255. Signal 256 is essentially equal to the time derivative of signal 251 multiplied by the gain of the differentiator circuit. For the circuit illustrated in FIG. 8, the current into the summing node is essentially equal to $CdE_3/dt$ where C is equal to the capacitance of the capacitor 253 and $E_3$ is equal to the voltage of signal 251. Thus, the output signal 256 is equal to $RCdE_3/dt$ where R is equal to the resistance of resistor 257.

Commercially available components which can be utilized in the circuit illustrated in FIG. 8 are as follows:

| | | |
|---|---|---|
| Operational amplifier 255 | | MC1741S, Motorola |
| Capacitor 253 | 10 μf, | Type X463UW, TRW |
| Capacitor 254 | 0.1 μf, | Type X463UW, TRW |
| Resistor 252 | 10 K, | RN55D, TRW |

| | | |
|---|---|---|
| -continued | | |
| Resistor 257 | 100 K, | RN55D, TRW |

The following examples are presented in further illustration of the invention.

EXAMPLE I

The process illustrated in FIG. 9 corresponds to the physical situation in which simultaneous control of composition and pressure in a well mixed tank is maintained by controlling the flow rate at the tank outlet. The process illustrated in FIG. 9 was simulated on a digital computer and override control using integral tracking was utilized. The feed rate was 8000 lbs/hr. and the feed composition was varied. The system pressure dynamics were modeled by $$dp/dt = 1.667 \times 10^{-4}(Fl-FO) \qquad (I)$$

and the concentration by $$dC/dt = 3.0 \times 10^{-5}(Fl.Cl-FO.C) \qquad (II)$$

where
- t = time (sec)
- p = tank pressure (psi)
- C = concentration of component A in tank (wt.%)
- Cl = concentration of component A in feed (wt.%)
- Fl = total feed flow (lb/hr)
- FO = total outlet flow (lb/hr).

The proportional-integral controller controlling pressure had a gain of 100 lbs/hr/psi and an integral time of 500 secs. The proportional-integral controller for concentration had a gain of 4000 lbs/hr/percentage and an integral time of 500 secs. The pressure set point value was 500 psi and the concentration set point was 16 percent. The variation in the feed composition as a function of time, the variation in the concentration and pressure as a function of time and the variation in the output flow as a function of time is illustrated in FIG. 10.

COMPARATIVE EXAMPLE I

The process illustrated in FIG. 9 was again simulated on a digital computer utilizing equations (I) and (II) in the same manner as described in Example I. Override control was again utilized but the prior art method of output tracking was utilized instead of integral tracking. Again, the proportional-integral controller controlling pressure had a gain of 100 lbs/hrs/psi and an integral time of 500 secs. The proportional-integral controller for concentration had a gain of 4000 lbs/hrs/percentage and an integral time of 500 secs. The pressure set point value was 500 psi and the concentration set point was 16 percent. Again, the concentration of the component A concentration and pressure, output flow due to integral, and output flow all as a function of time are illustrated in FIG. 11.

Figure 10:
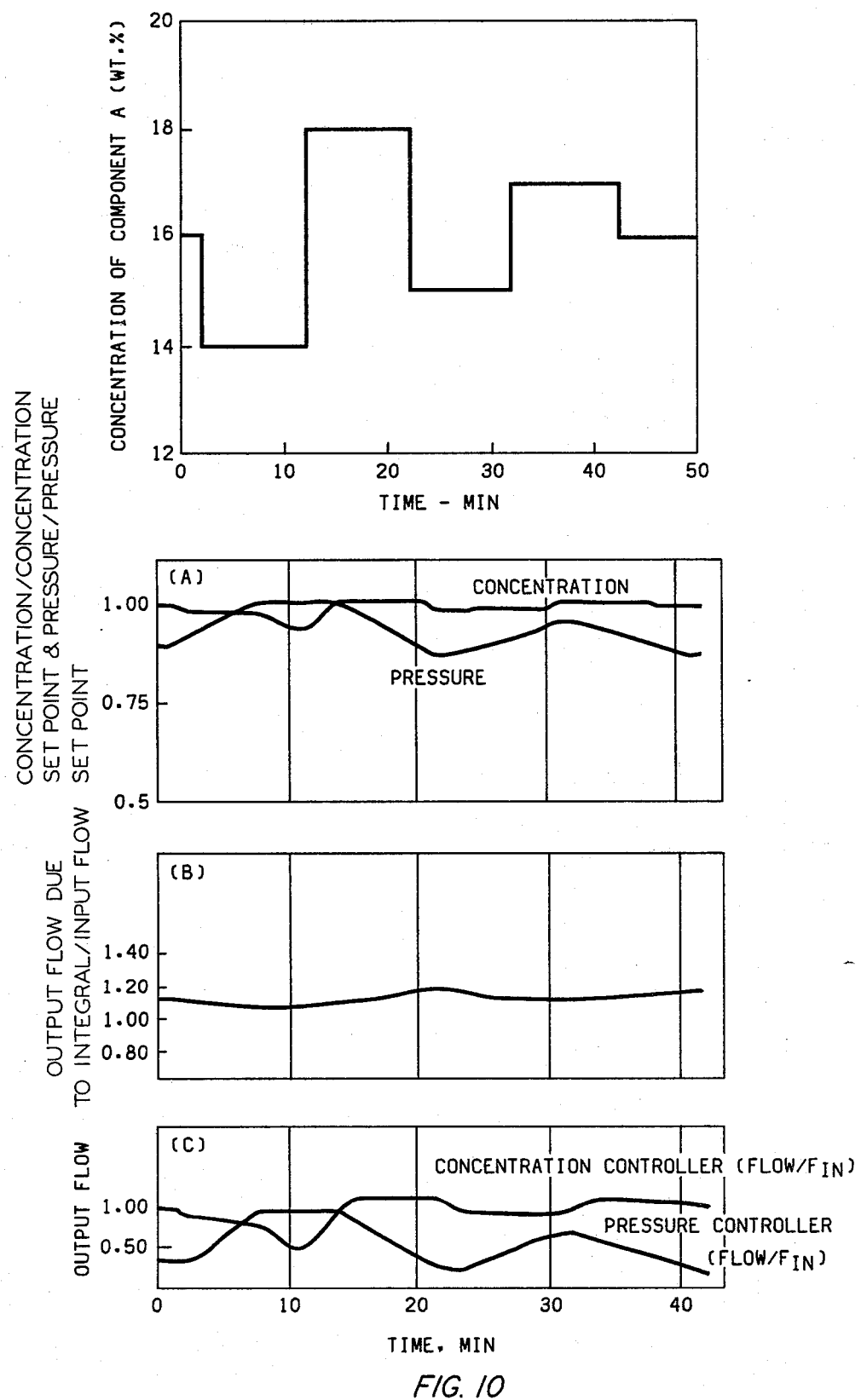
FIG. 10 is a graphical representation of the results of controlling the process of FIG. 9 utilizing override control with integral tracking.
Figure 11:
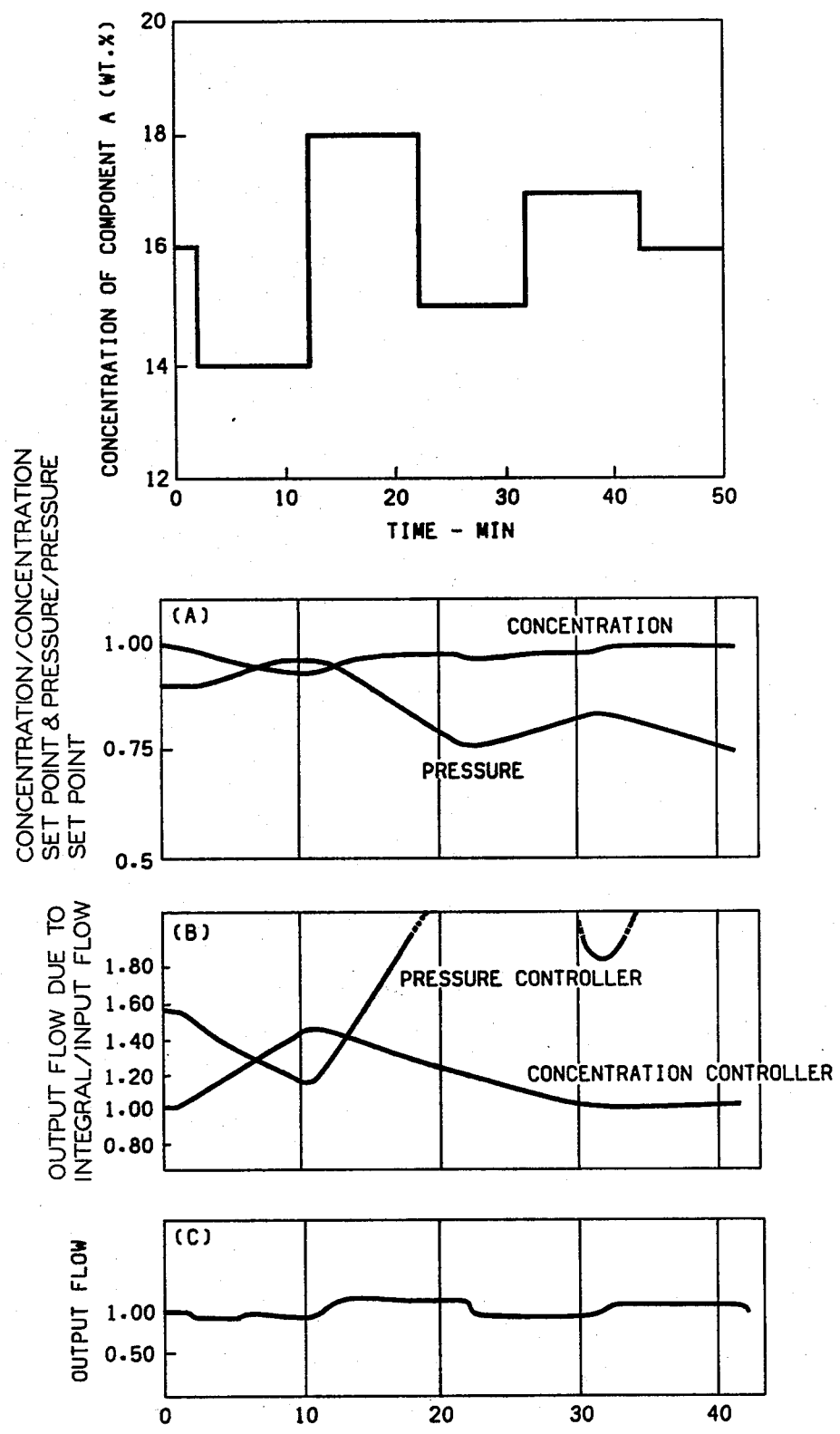
FIG. 11 is a graphical representation of the results of controlling the process illustrated in FIG. 9 utilizing override control with output tracking.

An inspection of the concentration and pressure responses as illustrated in FIGS. 10 and 11 reveals that the output tracking control did a much poorer job of controlling both variables than did the integral tracking control. This resulted to a large degree from inappropriate switching of the control in response to downgoing disturbances in the feed concentration level. At these points the override function switched control to the pressure controller, which allowed the concentration to drift away from its setpoint. At the same time, the process dynamics were such that the pressure never rose to its setpoint value. Thus neither variable was held on setpoint for most of the time period shown.

In contrast, the integral-tracking control maintains at least one variable essentially on setpoint for the full time period. During the portion of the response ($10 \leq t \leq 20$), when it is not possible to maintain the concentration at its desired value, the system switches control to the pressure controller and holds the pressure at its upper limit until the feed concentration changes.

Due to the natures of the controls it was necessary to show only one output response in FIG. 11 and only one integral response in FIG. 10. The value of controller output selected by the override logic in the integral-tracking case is found by taking the larger of the two outputs at any point. The switching times are obviously just those points where the two curves cross. The switching times for the output-tracking case are slightly harder to detect but are evident by the sharp changes in slope of the integral mode responses.

The invention has been described in terms of its presently preferred embodiment as is illustrated in FIGS. 1-8. For the sake of convenience, signals which supply power to the various chips shown in the schematics of FIGS. 2-6 and 8 have been omitted. Voltage levels required by the various chips are specified by the manufacturer and are well known to those familiar with the art.

Many different circuit configurations are possible which would perform the functions required of the circuits shown in FIGS. 1-8. These figures are illustrative of particular circuit configurations which will perform the required functions.

Specific components which are available commercially and which can be utilized in the practice of the invention have been listed. Values of resistors and capacitors used in these particular circuits are also given. Many different combinations of circuit values, particularly in the area of resistance and capacitance values are possible. A number of manufacturers supply the various components listed.

While the invention has been described in terms of the presently preferred embodiments, reasonable variations and modifications are possible by those skilled in the art, within the scope of the described invention and the appended claims.

That which is claimed is:

1. Apparatus comprising:
    at least first and second proportional-integral controller means;
    means for supplying a first signal representative of a first process variable to said first proportional-integral controller means;
    means for supplying a second signal representative of a set point for said first process variable to said first proportional-integral controller means, said first proportional-integral controller means supplying a third signal representative of $K_{P1}E_1 + K_{I1}\int E_1 dt$ where $K_{P1}$ is the proportional gain for said first proportional-integral controller means, $K_{I1}$ is the integral gain for said first proportional-integral controller means, and $E_1$ is responsive to the difference between said first signal and said second signal;
    means for supplying a fourth signal representative of a second process variable to said second proportional-integral controller means;

means for supplying a fifth signal representative of a set point for said second process variable to said second proportional-integral controller means, said second proportional-integral controller means supplying a sixth signal representative of $K_{P2}E_2 + K_{I2} \int E_2 dt$ where $K_{P2}$ is the proportional gain for said second proportional-integral controller means, $K_{I2}$ is the integral gain for said second proportional-integral controller means, and $E_2$ is responsive to the difference between said fourth signal and said fifth signal;

means for selecting said third signal or said sixth signal to be supplied as a process control signal;

means for forcing the integral mode of said first proportional-integral controller means to track the integral mode of said second proportional-integral controller means if said sixth signal is selected as said process control signal, said third signal being representative of $K_{P1}E_1 + K_{I2} \int E_2 dt$ if the integral mode of said first proportional-integral controller means is tracking the integral mode of said second proportional-integral controller means; and means for forcing the integral mode of said second proportional-integral controller means to track the integral mode of said first proportional-integral controller means if said third signal is selected as said process control signal, said sixth signal being representative of $K_{P2}E_2 + K_{I1} \int E_1 dt$ if the integral mode of said second proportional-integral controller means is tracking the integral mode of said first proportional-integral controller means.

2. Apparatus in accordance with claim 1 wherein said means for forcing the integral mode of said first proportional-integral controller means to track the integral mode of said second proportional-integral controller means if said sixth signal is selected as said process control signal comprises:
  means for establishing a seventh signal representative of $K_{I2} \int E_2 dt$; and
  means for supplying said seventh signal to the integrator portion of said first proportional-integral controller means as an initial condition.

3. Apparatus in accordance with claim 2 wherein said means for establishing said seventh signal comprises:
  means for establishing an eighth signal representative of $K_{P2}E_2$; and
  means for subtracting said eighth signal from said sixth signal to establish said seventh signal.

4. Apparatus in accordance with claim 3 wherein said means for selecting either said third signal or said sixth signal to be supplied as said process control signal comprises a high select means.

5. Apparatus in accordance with claim 1 wherein said means for forcing the integral mode of said second proportional-integral controller means to track the integral mode of said first proportional-integral controller means if said third signal is selected as said process control signal comprises:
  means for establishing a seventh signal representative of $K_{I1} \int E_1 dt$; and
  means for supplying said seventh signal to the integrator portion of said second proportional-integral controller means as an initial condition.

6. Apparatus in accordance with claim 5 wherein said means for establishing said seventh signal comprises:
  means for establishing an eighth signal representative of $K_{P1}E_1$; and
  means for subtracting said eighth signal from said sixth signal to establish said seventh signal.

7. Apparatus in accordance with claim 6 wherein said means for selecting either said third signal or said sixth signal to be supplied as said process control signal comprises a high select means.

8. An integral tracking override control method utilizing at least first and second proportional-integral controller means comprising the steps of:
  supplying a first signal representative of a first process variable to said first proportional-integral controller means;
  supplying a second signal representative of a set point for said first process variable to said first proportional-integral controller means, said first proportional-integral controller means supplying a third signal representative of $K_{P1}E_1 + K_{I1} \int E_1 dt$ where $K_{P1}$ is the proportional gain for said first proportional-integral controller means, $K_{I1}$ is the integral gain for said first proportional-integral controller means, and $E_1$ is responsive to the difference between said first signal and said second signal;
  supplying a fourth signal representative of a second process variable to said second proportional-integral controller means;
  supplying a fifth signal representative of a set point for said second process variable to said second proportional-integral controller means, said second proportional-integral controller means supplying a sixth signal representative of $K_{P2}E_2 + K_{I2} \int E_2 dt$ where $K_{P2}$ is the proportional gain for said second proportional-integral controller means, $K_{I2}$ is the integral gain for said second proportional-integral controller means, and $E_2$ is responsive to the difference between said fourth signal and said fifth signal;
  selecting said third signal or said sixth signal to be supplied as a process control signal;
  forcing the integral mode of said first proportional-integral controller means to track the integral mode of said second proportional-integral controller means if said sixth signal is selected as said process control signal, said third signal being representative of $K_{P1}E_1 + K_{I2} \int E_2 dt$ if the integral mode of said first proportional-integral controller means is tracking the integral mode of said second proportional-integral controller means; and
  forcing the integral mode of said second proportional-integral controller means to track the integral mode of said first proportional-integral controller means if said third signal is selected as said process control signal, said sixth signal being representative of $K_{P2}E_2 + K_{I1} \int E_1 dt$ if the integral mode of said second proportional-integral controller means is tracking the integral mode of said first proportional-integral controller means.

9. A method in accordance with claim 8 wherein said step of forcing the integral mode of said first proportional-integral controller means to track the integral mode of said second proportional-integral controller means if said sixth signal is selected as said process control signal comprises:
  establishing a seventh signal representative of $K_{I2} \int E_2 dt$; and
  supplying said seventh signal to the integrator portion of said first proportional-integral controller means as an initial condition.

10. A method in accordance with claim 9 wherein said step of establishing said seventh signal comprises:
establishing an eighth signal representative of $K_{P2}K_2$; and
subtracting said eighth signal from said sixth signal to establish said seventh signal.

11. A method in accordance with claim 10 wherein said step of selecting either said third signal or said sixth signal to be supplied as said process control signal comprises selecting the higher of said third and sixth signals.

12. A method in accordance with claim 8 wherein said step of forcing the integral mode of said second proportional-integral controller means to track the integral mode of said first proportional-integral controller means if said third signal is selected as said process control signal comprises:
establishing a seventh signal representative of $K_{I1} \int E_1 dt$; and
supplying said seventh signal to the integrator portion of said second proportional-integral controller means as an initial condition.

13. A method in accordance with claim 12 wherein said step of establishing said seventh signal comprises:
establishing an eighth signal representative of $K_{P1}E_1$; and
subtracting said eighth signal from said sixth signal to establish said seventh signal.

14. A method in accordance with claim 13 wherein said step of selecting either said third signal or said sixth signal to be supplied as said process control signal comprises selecting the higher of said third and sixth signals.

15. Apparatus comprising:
at least first and second proportional-integral-derivative controller means;
means for supplying a first signal representative of a first process variable to said first proportional-integral-derivative controller means;
means for supplying a second signal representative of a set point for said first process variable to said first proportional-integral-derivative controller means, said first proportional-integral-derivative controller means supplying a third signal representative of $K_{P1}E_1 + K_{I1} \int E_1 dt + K_{D1}/dt$ where $K_{P1}$ is the proportional gain for said first proportional-integral-derivative controller means, $K_{I1}$ is the integral gain for said first proportional-integral-derivative controller means, $K_{D1}$ is the derivative gain for said first proportional-integral-derivative controller means, and $E_1$ is responsive to the difference between said first signal and said second signal;
means for supplying a fourth signal representative of a second process variable to said second proportional-integral-derivative controller means;
means for supplying a fifth signal representative of a set point for said second process variable to said second proportional-integral-derivative controller means, said second proportional-integral-derivative controller means supplying a sixth signal representative of $K_{P2}E_2 + K_{I2} \int E_2 dt + K_{D2}dE_2/dt$ where $K_{P2}$ is the proportional gain for said second proportional-integral-derivative controller means, $K_{I2}$ is the integral gain for said second proportional-integral-derivative controller means, $K_{D2}$ is the derivative gain for said second proportional-integral-derivative controller means, and $E_2$ is responsive to the difference between said fourth signal and said fifth signal;
means for selecting said third signal or said sixth signal to be supplied as a process control signal;
means for forcing the integral mode of said first proportional-integral-derivative controller means to track the integral mode of said second proportional-integral-derivative controller means if said sixth signal is selected as said process control signal, said third signal being representative of $K_{P1}E_1 + K_{I2} \int E_2 dt + K_{D1}dE_1/dt$ if the integral mode of said first proportional-integral-derivative controller means is tracking the integral mode of said second proportional-integral-derivative controller means; and
means for forcing the integral mode of said second proportional-integral-derivative controller means to track the integral mode of said first proportional-integral-derivative controller means if said third signal is selected as said process control signal, said sixth signal being representative of $K_{P2}E_2 + K_{I1} \int E_1 dt + K_{D2}dE_2/dt$ if the integral mode of said second proportional-integral-derivative controller means is tracking the integral mode of said first proportional-integral-derivative controller means.

16. Apparatus in accordance with claim 15 wherein said means for forcing the integral mode of said first proportional-integral-derivative controller means to track the integral mode of said second proportional-integral-derivative controller means if said sixth signal is selected as said process control signal comprises:
means for establishing a seventh signal representative of $K_{I2} \int E_2 dt$; and
means for supplying said seventh signal to the integrator portion of said first proportional-integral-derivative controller means as an initial condition.

17. Apparatus in accordance with claim 16 wherein said means for establishing said seventh signal comprises:
means for establishing an eighth signal representative of $K_{P2}E_2$;
means for establishing a ninth signal representative of $K_{P2}E_2 + K_{I2} \int E_2 dt$; and
means for subtracting said eighth signal from said ninth signal to establish said seventh signal.

18. Apparatus in accordance with claim 17 wherein said means for selecting either said third signal or said sixth signal to be supplied as said process control signal comprises a high select means.

19. Apparatus in accordance with claim 15 wherein said means for forcing the integral mode of said second proportional-integral-derivative controller means to track the integral mode of said first proportional-integral-derivative controller means if said third signal is selected as said process control signal comprises:
means for establishing a seventh signal representative of $K_{I1} \int E_1 dt$; and
means for supplying said seventh signal to the integrator portion of said second proportional-integral-derivative controller means as an initial condition.

20. Apparatus in accordance with claim 19 wherein said means for establishing said seventh signal comprises:
means for establishing an eighth signal representative of $K_{P1}E_1$;
means for establishing a ninth signal representative of $K_{P1}E_1 + K_{I1} \int E_1 dt$; and
means for subtracting said eighth signal from said ninth signal to establish said seventh signal.

21. Apparatus in accordance with claim 20 wherein said means for selecting either said third signal or said sixth signal to be supplied as said process control signal comprises a high select means.

22. An integral tracking override control method utilizing at least first and second proportional-integral-derivative controller means comprising the steps of:
   supplying a first signal representative of a first process variable to said first proportional-integral-derivative controller means;
   supplying a second signal representative of a set point for said first process variable to said first proportional-integral-derivative controller means, said first proportional-integral-derivative controller means supplying a third signal representative of $K_{P1}E_1 + K_{I1}\int E_1 dt + K_{D1}dE_1/dt$ where $K_{P1}$ is the proportional gain for said first proportional-integral-derivative controller means, $K_{I1}$ is the integral gain for said first proportional-integral-derivative controller means, $K_{D1}$ is the derivative gain for said first proportional-integral-derivative controller means, and $E_1$ is responsive to the difference between said first signal and said second signal;
   supplying a fourth signal representative of a second process variable to said second proportional-integral-derivative controller means;
   supplying a fifth signal representative of a set point for said second process variable to said second proportional-integral-derivative controller means, said second proportional-integral-derivative controller means supplying a sixth signal representative of $K_{P2}E_2 + K_{I2}\int E_2 dt + K_{D2}dE_2/dt$ where $K_{P2}$ is the proportional gain for said second proportional-integral-derivative controller means, $K_{I2}$ is the integral gain for said second proportional-integral-derivative controller means, $K_{D2}$ is the derivative gain for said second proportional-integral-derivative controller means, and $E_2$ is responsive to the difference between said fourth signal and said fifth signal;
   selecting said third signal or said sixth signal to be supplied as a process control signal;
   forcing the integral mode of said first proportional-integral-derivative controller means to track the integral mode of said second proportional-integral-derivative controller means if said sixth signal is selected as said process control signal, said third signal being representative of $K_{P1}E_1 + K_{I2}\int E_2 dt + K_{D2}dE_1/dt$ if the integral mode of said first proportional-integral-derivative controller means is tracking the integral mode of said second proportional-integral-derivative controller means; and
   forcing the integral mode of said second proportional-integral-derivative controller means to track the integral mode of said first proportional-integral-derivative controller means if said third signal is selected as said process control signal, said sixth signal being representative of $K_{P2}E_2 + K_{I1}\int E_1 dt + K_{D2}dE_2/dt$ if the integral mode of said second proportional-integral-derivative controller means is tracking the integral mode of said first proportional-integral-derivative controller means.

23. A method in accordance with claim 22 wherein said step of forcing the integral mode of said first proportional-integral-derivative controller means to track the integral mode of said second proportional-integral-derivative controller means if said sixth signal is selected as said process control signal comprises:
   establishing a seventh signal representative of $K_{I2}\int E_2 dt$; and
   supplying said seventh signal to the integrator portion of said first proportional-integral-derivative controller means as an initial condition.

24. A method in accordance with claim 23 wherein said step of establishing said seventh signal comprises:
   establishing an eighth signal representative of $K_{P2}E_2$;
   establishing a ninth signal representative of $K_{P2}E_2 + K_{I2}\int E_2 dt$; and
   subtracting said eighth signal from said ninth signal to establish said seventh signal.

25. A method in accordance with claim 24 wherein said step of selecting either said third signal or said sixth signal to be supplied as said process control signal comprises selecting the higher of said third and sixth signals.

26. A method in accordance with claim 22 wherein said step of forcing the integral mode of said second proportional-integral-derivative controller means to track the integral mode of said first proportional-integral-derivative controller means if said third signal is selected as said process control signal comprises:
   establishing a seventh signal representative of $K_{I1}\int E_1 dt$; and
   supplying said seventh signal to the integrator portion of said second proportional-integral-derivative controller means as an initial condition.

27. A method in accordance with claim 26 wherein said step of establishing said seventh signal comprises:
   establishing an eighth signal representative of $K_{P1}E_1$;
   establishing a ninth signal representative of $K_{P1}E_1 + K_{I1}\int E_1 dt$; and
   subtracting said eighth signal from said ninth signal to establish said seventh signal.

28. A method in accordance with claim 27 wherein said step of selecting either said third signal or said sixth signal to be supplied as said process control signal comprises selecting the higher of said third and sixth signals.

29. Apparatus comprising:
   at least first and second controller means;
   means for supplying a first signal representative of a first process variable to said first controller means;
   means for supplying a second signal representative of a set point for said first process variable to said first controller means, said first controller means supplying a third signal which is responsive to the difference between said first signal and said second signal, said third signal having at least a proportional term and an integral term;
   means for supplying a fourth signal representative of a second process variable to said second controller means;
   means for supplying a fifth signal representative of a set point for said second process variable to said second controller means, said second controller means supplying a sixth signal which is responsive to the difference between said fourth signal and said fifth signal, said sixth signal having at least a proportional term and an integral term;
   means for selecting said third signal or said sixth signal to be supplied as a process control signal;
   means for forcing only the integral term of said third signal to track only the integral term of said sixth signal if said sixth signal is selected as said process control signal; and means for forcing only the integral term of said sixth signal to track only the integral term of said third signal if said third signal is selected as said process control signal.

30. An integral tracking override control method utilizing at least first and second controller means comprising the steps of:

supplying a first signal representative of a first process variable to said first controller means;

supplying a second signal representative of a set point for said first process variable to said first controller means, said first controller means supplying a third signal which is responsive to the difference between said first signal and said second signal, said third signal having at least a proportional term and an integral term;

supplying a fourth signal representative of a second process variable to said second controller means;

supplying a fifth signal representative of a set point for said second process variable to said second controller means, said second controller means supplying a sixth signal which is responsive to the difference between said fourth signal and said fifth signal, said sixth signal having at least a proportional term and an integral term;

selecting said third signal or said sixth signal to be supplied as a process control signal;

forcing only the integral term of said third signal to track the integral term of said sixth signal if said sixth signal is selected as said process control signal; and forcing only the integral term of said sixth signal to track only the integral term of said third signal if said third signal is selected as said process control signal.

31. An integral tracking override control method comprising the steps of:

comparing a first process variable signal and a first set point signal for said first process variable signal and establishing a first signal responsive to the difference between said first process variable signal and said first set point signal, said first signal having at least a proportional term and an integral term;

comparing a second process variable signal and a second set point signal for said second process variable signal and establishing a second signal responsive to the difference between said second process variable signal and said second set point signal, said second signal having at least a proportional term and an integral term;

selecting said first signal or said second signal to be supplied as a process control signal;

forcing only the integral term of said first signal to be substantially equal to only the integral term of said second signal if said second signal is selected as said process control signal; and forcing only the integral term of said second signal to be substantially equal only to the integral term of said first signal if said first signal is selected as said process control signal.

* * * * *